May 11, 1943.                E. S. AKER                2,319,027
                            UNIVERSAL JOINT
                         Filed Jan. 22, 1941            2 Sheets-Sheet 2

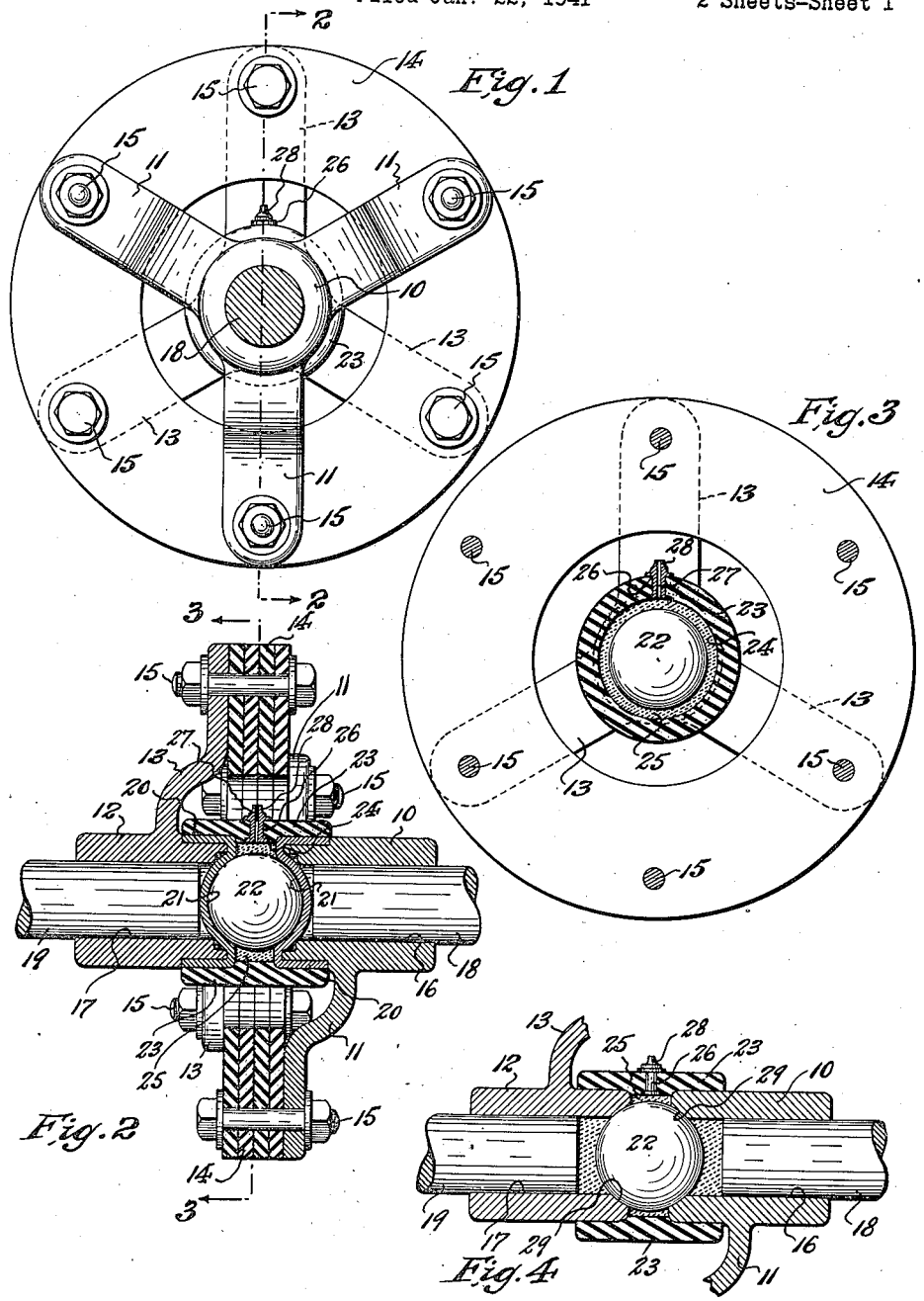

INVENTOR.
Evender S. Aker,
BY
George D. Richards
ATTORNEY

Patented May 11, 1943

2,319,027

UNITED STATES PATENT OFFICE 2,319,027

UNIVERSAL JOINT

Evender S. Aker, Belleville, N. J.

Application January 22, 1941, Serial No. 375,433

2 Claims. (Cl. 64—13)

This invention relates to improvements in universal joints for connecting power transmission shafts, the axes of which intersect; and the invention has reference, more particularly, to a universal joint structure having means to retain opposed ends of the shafts served thereby against displacement relative to an established point of intersection of the shaft axes.

The invention has for an object to provide a novel construction of universal joint for connecting power transmission shafts which includes a novel arrangement of ball and socket means located at the point of intersection of the shaft axes, whereby angular movements of the shafts are permitted relative to the point of intersection of their axes which is established as a fixed center of such movements by said ball and socket means, and so controlled thereby that lateral displacement of the opposed ends of the shafts relative to such established center of angular movement is prevented.

The invention has for another object to provide novel means for enclosing the ball and socket means in such manner as to provide a chamber for holding and supplying lubricant thereto.

Another object of the invention is to provide, in a universal joint characterized as above stated, means to link the opposed shafts against relative longitudinal displacement while nevertheless permitting relative angular movements thereof.

Other objects of this invention, not at this time more particularly enumerated, will be understood from the following detailed description of the same.

Illustrative embodiments of this invention are shown in the accompanying drawings, in which:

Fig. 1 is an end elevation of one form of a universal joint structure according to this invention; Fig. 2 is a longitudinal sectional view through the same, taken on line 2—2 in Fig. 1; and Fig. 3 is a transverse sectional view through the same, taken on line 3—3 in Fig. 2.

Fig. 4 is a fragmentary longitudinal sectional view of a somewhat modified form of the universal joint structure according to this invention.

Figure 5:
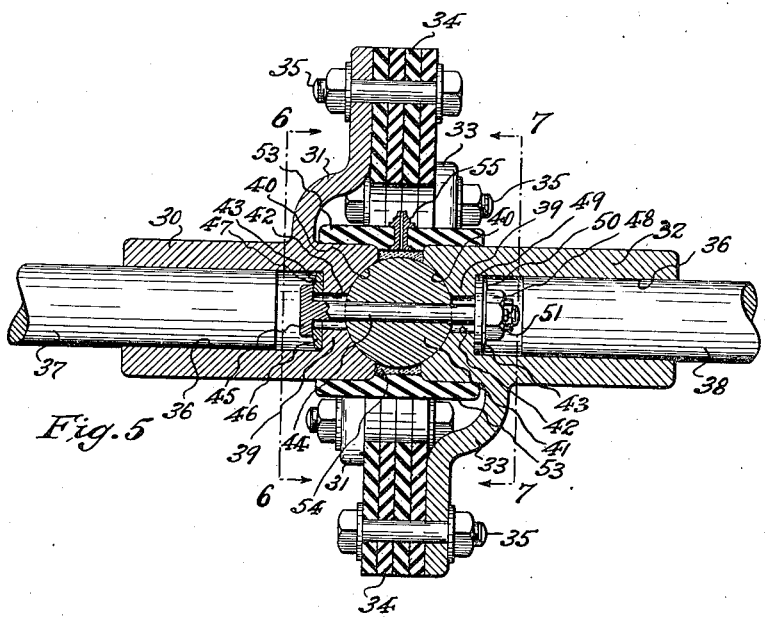
Figure 6:
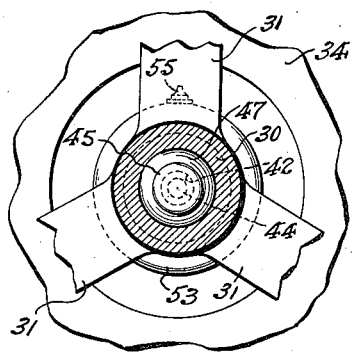
Figure 7:
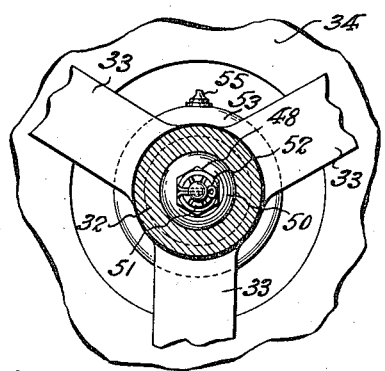

Fig. 5 is a longitudinal sectional view of another modified form of universal joint structure according to this invention, which includes means for linking the opposed shafts against relative longitudinal displacement; Fig. 6 is a fragmentary transverse sectional view thereof, taken on line 6—6 in Fig. 5; and Fig. 7 is another fragmentary transverse sectional view thereof, taken on line 7—7 in Fig. 5.

Similar characters of reference are employed in the herein-above described views, to indicate corresponding parts.

Referring to Figs. 1 to 3 inclusive of the drawings, the illustrative embodiment of the universal joint according to this invention, as shown therein, comprises, a pair of opposed spiders or equivalent devices to which the shafts to be joined are respectively rigidly secured. One said spider comprises a hub 10 having a plurality of radial arms 11, and the other said spider likewise comprises a hub 12 having a plurality of radial arms 13. The arms 13 of the one spider are angularly offset relative to the arms 11 of the other spider so as to lie midway therebetween, in the conventional manner. Interposed between the arms 11 and 13 of the opposed spiders, is a flexible annular joint body 14, which may be made of any suitable resiliently flexible material, such e. g. as soft rubber, with or without incorporated reenforcing material. Said annular joint body 14 is secured to and between the arms 11 and 13 by bolts 15 which engage through the respective arms and said body 14. The hubs 10 and 12 are respectively provided with axial bores 16 and 17 in which the opposing ends of the respective shafts 18 and 19 to be joined are rigidly secured in any conventional or other suitable manner. Suitably mounted on the inner end-portion of each hub 10 and 12, which may be diametrically reduced to receive the same if so desired, is the ferrule member 20, the end wall of which is shaped to provide a bearing socket or ball seat 21 having a curvature corresponding to that of a ball bearing 22 which is interposed between bearing sockets or ball seats 21. Said bearing sockets or ball seats 21 are respectively centered in alignment with the axis of the respectively hub and attached shaft to which the ferrule member 20 in which it is formed is assembled. By this arrangement the ball bearing 22, when mounted between the spider hubs in engagement with the respective bearing sockets or ball seats of the ferrule members carried by said hubs, will be disposed at the point of angular intersection of the shaft axes, whereby the ball bearing 22 will operate to establish a fixed center about which the relative angular movements of the joined shafts will take place in such controlled manner that lateral displacement of the opposed ends of said joined shafts relative to such established fixed center of movement is prevented.

The advantage of providing the ferrule members 20 having the bearing sockets or ball seats 21 as parts separate from the hubs of the joint is that the former may be made of hardened steel or other wear resisting material, while the latter may be made of cast or wrought iron or other material which may be chosen for other characteristics.

Arranged to engage over and extend between the inner end portions of the opposed hubs 10 and 12, and thus to concentrically surround and enclose the described ball and socket structure, is a flexible housing sleeve 23. This housing sleeve is also made of a suitable resiliently flexible material, such e. g. as soft rubber, with or without incorporated reenforcing material. The ends of said housing sleeve 23 may be constrictively and thus strongly bound frictionally to the inner end portions of the hubs 10 and 12, or if desired may be cemented, vulcanized or otherwise affixed thereto, or to the ferrule members. The annular space 24 intermediate the housing sleeve 23 and the ball bearing 22 provides a chamber for holding and applying to the ball and socket structure a suitable lubricant 25, such as a grease, oil or the like. To facilitate charging and replenishing this chamber with lubricant, a suitable fitting 26, having an admission passage 27, is affixed to and extended through the wall of said housing sleeve so as to communicate with the interior chamber bounded thereby. Preferably the fitting 26 is provided with an external conical end 28 of the type suitable to receive engagement of a grease gun thereto, when it is desired, by such means, to introduce a lubricant into said chamber.

Referring to Fig. 4 of the drawings, I have shown therein a somewhat simplified form of the universal joint structure according to this invention. In this modified form, the ferrule members 20 with their bearing sockets or ball seats 21 are eliminated, and annular bearing sockets or ball seats 29 are formed or ground directly in the inner ends of the hubs 10 and 12 of the joint spiders, so as to directly mount the ball bearing 22 therebetween. In this construction the end portions of the housing sleeve 23 are respectively engaged over and bound to the exterior surfaces of said inner end portions of the hubs 10 and 12, so as to enclose the ball bearing 22 and provide a lubricant holding chamber for applying the lubricant to said ball bearing and the bearing sockets or ball seats 29.

Referring to Figs. 5 to 7 of the drawings, I have shown therein another modified form of the universal joint structure according to this invention, wherein means are additionally incorporated therein designed to prevent separating longitudinal play between the shafts which are coupled by the joint, without interfering with relative angular movement thereof within limits. A joint so modified is of especial advantage e. g. in marine propulsion transmissions for joining a propeller shaft to a power shaft. In such use, when the power driven propeller is reversed to impart sternward movement to craft served thereby, strong outward endwise thrust is imparted to the propeller shaft tending to separate its opposed end from that of the power shaft, and thereby imparting undesired stresses and strains to the joint structure. In the modified joint structure shown in Figs. 5 to 7 inclusive, I have provided means to avoid this, while nevertheless retaining the advantages of controlled relative angular movements of the shafts about an established center, coincident with a fixed point of intersection of the shaft axes, which is afforded by the included ball and socket means.

In this modified joint structure illustrated in Figs. 5 to 7 inclusive, the same comprises a pair of opposed spiders or equivalent devices. One such spider comprises a hub 30 having a plurality of radial arms 31, and the other spider likewise comprises a hub 32 having a plurality of radial arms 33. The arms of one spider are angularly offset relative to the arms of the other so as to lie midway therebetween. Interposed between the arms 31 and 33 is a flexible annular joint body 34, the same being secured to and between the arms by bolts 35 which engage through the respective arms and said joint body 34. The outer end portions of the hubs 30 and 32 are each provided with outwardly open bores 36 in which the opposing ends of the respective shafts 37 and 38 to be joined are rigidly secured in any conventional or other suitable manner. The inner end portions of said bulbs 31 and 33 are each provided with an end wall 39, the exterior face of which is shaped to provide a bearing socket or ball seat 40 having a curvature corresponding to that of a ball-bearing 41, which is interposed between said inner end portions of the spider hubs 30 and 32. Provided in each hub end wall 39 is an opening 42 aligned with the axis of the hub and the shaft connected therewith, thereby providing an annular shoulder 43 at the interior face of the hub end wall. Extending diametrically through the ball-bearing 41 is a link bolt 44, the opposite end portions of which extend through the openings 42 of the respective hub end walls 39. The diameters of the openings 42 are substantially in excess of the diameter of the lnk bolt 44, whereby lateral play of the link bolt end portions relative to the hubs into which they project is permitted. One end of the link bolt 44 is provided with a head 45, and interposed between this head and the shoulder 43 of the hub (being, as illustrated, the hub 30) is a bearing washer 46 having a convex bearing surface 47 of proper curvature, against which the inner or under face of the head 45 slidingly bears. Said inner or under face of the head 45 is preferably shaped to conform to the curved bearing surface 47 of the bearing washer 46. The other end portion of the link bolt 44 is screw-threaded to receive a nut 48, and interposed between this nut and the shoulder of the other hub (being, as illustrated, the hub 32) is a bearing washer 49 also having a convex bearing surface 50 of proper curvature, against which the inner or under face of said nut 48 slidingly bears. Said inner or under face of the nut 48 is preferably shaped to conform to the curved bearing surface 50 of the bearing washer 49. Preferably said nut 48 is provided with a castellated exterior end 51 engageable by a cotter pin 52 passed through the link bolt 44, whereby to lock the nut 48 in operative position. As in the previously described joint structures, the end portions of a flexible housing sleeve 53 are respectively engaged over and bound to the exterior surfaces of the inner end portions of the hubs 30 and 32, so as to enclose the ball bearing 41, and thereby provide a lubricant holding chamber for applying the contained lubricant 54 to said ball bearing and the bearing sockets or ball seats 40. It will be apparent that said lubricant will also work beyond the ball and socket elements and through the openings 42 so as to also be supplied to and lubricate the bearing surfaces of the washers 46 and 49 and cooperating surfaces of the link bolt head 45 and nut 48. The housing sleeve 53 is provided with a suitable fitting 55 for introducng the lubricant into the interior thereof, similarly as already above described.

I am aware that various changes could be made in the constructions above set forth, and many apparently widely different embodiments of this invention could be made without departing from the scope thereof. It is therefore intended that all matter contained in the above description or shown in the accompanying drawings shall be interpreted as illustrative and not in a limiting sense.

I claim:

1. A universal joint structure for coupling shafts end to end subject to relative angular movements comprising, opposed spider members having hubs to which the shafts are respectively rigidly connected, a flexible annular joint body secured to and between the arms of said spider members, opposed inner end portions of said hubs having bearing sockets, a ball bearing mounted between and in engagement with said sockets whereby to establish a fixed center about which relative angular movements of said shafts take place, a soft rubber cylindrical tubular housing sleeve of substantial wall thickness having its ends telescopically engaged respectively over the inner end portions of said hubs to provide a closed chamber intermediate said hubs for holding and suppling a lubricant to and around the ball and socket elements, and lubricant admission means extending through the wall of said housing sleeve said admission means having an externally propecting conical seating means adapted to receive sealing engagement of a grease gun nozzle.

2. A universal joint structure for coupling shafts end to end subject to relative angular movements comprising, opposed spider members having hubs to which the shafts are respectively rigidly connected, a flexible annular joint body secured to and between the arms of said spider members, ferrule members having bearing sockets respectively mounted upon the opposed inner end portions of said hubs, a ball bearing mounted between and in engagement with said sockets whereby to establish a fixed center about which relative angular movements of said shafts take place, a soft rubber cylindrical tubular housing sleeve of substantial wall thickness having its ends telescopically engaged respectively over the inner end portions of said hubs and the ferrule members thereon to provide a chamber for holding and supplying a lubricant to and around the ball and socket elements, and lubricant admission means extending through the wall of said housing sleeve said admission means having an externally projecting conical seating means adapted to receive sealing engagement of a grease gun nozzle.

EVENDER S. AKER.